US008382569B1

(12) United States Patent
Falciglia, Sr.

(10) Patent No.: US 8,382,569 B1
(45) Date of Patent: Feb. 26, 2013

(54) POKER GAME HAVING SEQUENTIAL HANDS WITH INCREASING NUMBERS OF CARDS

(76) Inventor: Sal Falciglia, Sr., Ridgewood, NJ (US)

( * ) Notice: Subject to any disclaimer, the term of this patent is extended or adjusted under 35 U.S.C. 154(b) by 0 days.

(21) Appl. No.: 13/275,949

(22) Filed: Oct. 18, 2011

Related U.S. Application Data

(60) Provisional application No. 61/574,765, filed on Aug. 8, 2011.

(51) Int. Cl.
*A63F 1/00* (2006.01)
*A63F 13/00* (2006.01)

(52) U.S. Cl. .......................................... 463/13; 273/292

(58) Field of Classification Search ................ 463/1, 13, 463/16, 20; 273/292
See application file for complete search history.

(56) References Cited

U.S. PATENT DOCUMENTS

| | | | | |
|---|---|---|---|---|
| 6,179,711 | B1 * | 1/2001 | Yoseloff | 463/25 |
| 6,478,675 | B1 * | 11/2002 | Awada | 463/13 |
| 6,533,279 | B2 * | 3/2003 | Moody et al. | 273/292 |
| 6,705,943 | B2 * | 3/2004 | Awada | 463/13 |
| 7,389,990 | B2 * | 6/2008 | Mourad | 273/292 |
| 7,621,535 | B2 * | 11/2009 | Spivey | 273/292 |
| 7,704,136 | B2 * | 4/2010 | Shackleford et al. | 463/13 |
| 2002/0187823 | A1 * | 12/2002 | Khal | 463/13 |
| 2003/0207707 | A1 * | 11/2003 | Slomiany et al. | 463/16 |
| 2005/0110215 | A1 * | 5/2005 | Jackson | 273/292 |
| 2005/0275167 | A1 * | 12/2005 | Wilson | 273/292 |
| 2006/0082064 | A1 * | 4/2006 | Caterinicchio et al. | 273/292 |
| 2006/0108740 | A1 * | 5/2006 | Kekempanos et al. | 273/292 |
| 2008/0227516 | A1 * | 9/2008 | Itskov et al. | 463/16 |
| 2009/0315261 | A9 * | 12/2009 | Kekempanos et al. | 273/292 |
| 2010/0203948 | A1 * | 8/2010 | Falciglia, Sr. | 463/20 |
| 2010/0289220 | A1 | 11/2010 | Jackson | |
| 2012/0032399 | A1 * | 2/2012 | Heller | 273/292 |
| 2012/0086169 | A1 * | 4/2012 | Willis | 273/292 |

OTHER PUBLICATIONS 3 5 7 Poker How to Play, http://www.goodcasinos.net/3-5-7-poker-how-to-play.htm, Copyright 2001, Good Online Casinos, printed Nov. 3, 2011.

* cited by examiner

*Primary Examiner* — Dmitry Suhol
*Assistant Examiner* — Jason Skaarup
(74) *Attorney, Agent, or Firm* — Weide & Miller, Ltd.

(57) ABSTRACT

A poker-type card game offers a player the opportunity to play successive poker hands having increasing numbers of cards. In a method of the game, a player plays a 3 card draw poker stage of the game. If the outcome of that game is winning, the player uses that hand and an additional two cards in the play of a 5 card draw poker game. If the outcome of that game is winning the player uses that hand an additional two cards in the play of a 7 card draw poker hand. Winnings may be paid for winning outcomes at each stage of the game.

7 Claims, 4 Drawing Sheets

POKER GAME HAVING SEQUENTIAL HANDS WITH INCREASING NUMBERS OF CARDS

RELATED APPLICATION DATA

This application claims priority to U.S. Provisional Application Ser. No. 61/574,765 filed Aug. 8, 2011.

FIELD OF THE INVENTION

The present invention relates to methods and devices for presenting and playing games.

BACKGROUND OF THE INVENTION

Casinos continue to seek new and exciting games to present to players in order to maintain player interest. One of the most popular casino or wagering-style games is poker, including the variation presented at a gaming machine known as video poker. Various styles of video poker have been developed in order to make the game more exciting. For example, in the variation known as Triple Play™ offered by IGT, a player is dealt a base hand of 5 cards and elects cards to be held. The held cards are replicated into one or more additional hands. Each hand, including the base hand, is then completed with one or more additional cards to form multiple 5 card hands, and those multiple hands are then all evaluated against a pay table of winning hands. While this game has been extremely popular, players still desire and seek out even newer games, including poker and video poker games.

SUMMARY OF THE INVENTION

Aspects of the invention comprise methods of playing and presenting games and gaming machines configured to present games.

In a preferred embodiment a game of the invention comprises a poker type card game in which a player has the opportunity to play successive or sequential poker hands having increasing numbers of cards. In a preferred embodiment, a player has an opportunity to play a 3 card poker hand, a 5 card poker hand and a 7 card poker hand. In a preferred embodiment, the player is permitted to advance to each successive hand or stage of the game if the previous stage was a winning outcome.

In one embodiment, a player is dealt an initial 3 card hand and is permitted to discard and replace none, one or more or all of the cards in the initial 3 card hand. After any replacement cards are dealt, a final 3 card hand is formed and it is evaluated. If the final 3 card hand is losing, the game preferably ends. If the final 3 card hand is winning, the player preferably advances to the next stage or round of the game in wherein 2 additional cards are dealt and combined with the player's final 3 card hand to form an initial 5 card hand.

The player is permitted to discard and replace none, one or more or all of the cards in the initial 5 card hand. After any replacement cards are dealt, a final 5 card hand is formed and it is evaluated. If the final 5 card hand is losing, the game preferably ends. If the final 5 card hand is winning, the player preferably advances to the next stage or round of the game wherein 2 additional cards are dealt and combined with the player's final 5 card hand to form an initial 7 card hand.

The player is permitted to discard and replace none, one or more or all of the cards in the initial 7 card hand. After any replacement cards are dealt, a final 7 card hand is formed and it is evaluated.

Preferably, the game is played as a wagering game. In such an implementation, the player may be paid winnings for winning outcomes based upon one or more pay tables. For example, a first 3 card pay table may be used to define one or more winning 3 card hands and associated payouts. A second 5 card pay table may be used to define one or more winning 5 card hands and associated payouts. A third 7 card pay table may be used to define one or more winning 7 card hands and associated payouts. In this configuration, a player may be awarded winnings for achieving a winning 3, 5 and/or 7 card hand as part of the same game.

The game of the invention may be implemented using physical cards, such as at a gaming table. Preferably, however, the games of the invention are implemented by a gaming machine. Such machine may include a wager accepting device and a controller configured to execute software which implements the steps of the invention. Game information, such as images of the cards comprising the player's various initial and final hands, including any replacement cards, may be displayed on an electronic display of the gaming machine.

Further objects, features, and advantages of the present invention over the prior art will become apparent from the detailed description of the drawings which follows, when considered with the attached figures.

DETAILED DESCRIPTION OF THE INVENTION

Figure 1:
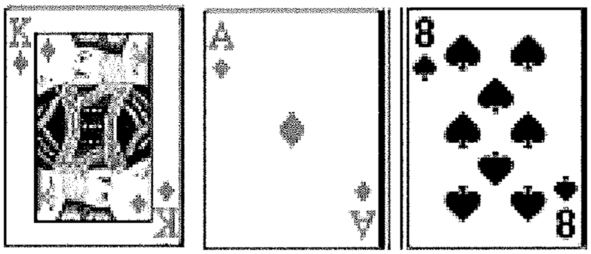
FIGS. 1-9 illustrate an example game played in accordance with the invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention comprises methods of playing and presenting games. Another aspect of the invention comprises gaming devices and systems for presenting games of the invention.

In general, one embodiment of the invention is a poker-type card game in which a player has the opportunity to play successive or sequential poker hands having increasing numbers of cards. In a preferred embodiment, a player has an opportunity to play a 3 card poker hand, a 5 card poker hand and a 7 card poker hand. In a preferred embodiment, cards used in each hand are carried over to the successive hand.

Preferably, the game of the invention is played and presented as a wagering type game. In that event, in a step S1, the player places a wager and that wager is accepted, such as by the casino offering the game. As is known, the wager preferably comprises monies (coins, paper currency) or monetary equivalent (such as chips or credits). Of course, the form of the wager and how it is presented and accepted may vary. For example, if the game is presented at a table using physical cards, the player may place the wager using chips. If the game is presented at an electronic gaming machine, the player may place the wager by providing monetary value to the gaming machine and then wagering one or more credits. Of course, other forms of wagers may be utilized including points, free games, etc.

In one embodiment, a player may make a wager of one or more sizes, such as of one or more credits or base denominations. For example, a player may make a wager of 1, 2, 3, 4 or 5 credits or 1, 2, 3, 4, or 5 times a base denomination (where such denomination might be $0.01, $0.05, $0.10, $0.25, $0.50, $1.00 US dollars or the like). Of course, other wagers, including wagers of more than 5 credits or the like, such as 6 or 10 credits, might be allowed or required.

In one embodiment, a player may be required to place a maximum wager (such as 5 or 6 credits) in order to qualify for all game features, such as bonus pays, progressive jackpots or the like.

In a step S2, the player is dealt an initial 3 card hand from a set of cards. As described below, the set of cards preferably comprises a standard 52 card deck of cards. However, the set of cards could comprise a shoe of multiple decks of cards or a standard deck of cards augmented by one or more wildcards or the like.

In a step S3, the player selects none, one or more or all of the 3 cards from the initial 3 card hand to hold and/or discard. For example, a player may press a hold button of a gaming machine corresponding to each card from the initial 3 card hand which the player wishes to hold or keep.

In a step S4, any cards which are not held are discarded and replacement cards are dealt from the remaining cards in the set of cards (i.e. the original set of cards less the initial 3 dealt cards at this point) for each discarded card. For example, if the player held all 3 cards from the initial hand, no cards would be discarded and replaced. If the player held 2 of the 3 cards from the initial hand, the 1 non-held card would be discarded and replaced. If the player held no cards from the initial hand, all 3 initial cards would be discarded and replaced. After any cards are discarded and replaced, a final 3 card poker hand is formed.

It is noted that in one embodiment, discarded cards may be returned to the set of cards and thus might be received again by the player at a later point in the same game. In another embodiment, discarded cards are not used again in the same game.

In a step S5, the player's final 3 card poker hand is evaluated to determine if it is a winning outcome. In a preferred embodiment, various combinations of 3 cards may be formed. One or more, but preferably not all, of those combinations are defined as winning combinations. For example, winning outcomes or combinations may be defined by a pay table such as set forth below.

TABLE 1

| 3 CARD POKER HAND | |
|---|---|
| HAND | PAYOUT |
| PAIR (less than Jacks) | 1 |
| PAIR OF JACKS OR BETTER | 2 |
| 3 OF A KIND | 5 |
| STRAIGHT | 10 |
| FLUSH | 15 |
| STRAIGH FLUSH | 20 |
| ROYAL FLUSH | 25 |

In a step S6, if the player's final 3 card poker hand is a winning hand, the player is preferably paid winnings for a winning game outcome. Table 1 illustrates various credit payouts based upon a 1 credit wager. Of course, the amounts of the payouts and the defined winning hands/outcomes may vary. In addition, the player then advances to a second stage or portion of the game. If the player's final 3 card hand was a non-winning (i.e. losing) outcome, then the game preferably terminates with the player losing their wager.

If the player advances, then his final 3 card hand is preferably carried over to the next stage of the game. In a step S7, the player is dealt 2 additional cards from the remaining cards in the set of cards (which may or may not include any discarded cards, as described above). These 5 cards are combined to form the player's initial 5 card poker hand.

In a step S8, the player selects none, one or more or all of the 5 cards to hold and/or discard. For example, a player may press a hold button of a gaming machine corresponding to each card from the initial 5 card hand which the player wishes to hold or keep.

In a step S9, any cards which are not held are discarded and replacement cards are dealt from the remaining cards in the set of cards for each discarded card. For example, if the player held all 5 cards from the initial hand, no cards would be discarded and replaced. If the player held 3 of the 5 cards from the initial hand, the 2 non-held cards would be discarded and replaced. If the player held no cards from the initial hand, all 5 initial cards would be discarded and replaced. After any cards are discarded and replaced, a final 5 card poker hand is formed.

In a step S10, the player's final 5 card poker hand is evaluated to determine if it is a winning outcome. In a preferred embodiment, various combinations of 5 cards may be formed. One or more, but preferably not all, of those combinations are defined as winning combinations. For example, winning outcomes or combinations may be defined by a pay table such as set forth below.

TABLE 2

| 5 CARD POKER HAND | |
|---|---|
| HAND | PAYOUT |
| PAIR OF JACKS OR BETTER | 1 |
| TWO PAIR | 2 |
| 3 OF A KIND | 5 |
| STRAIGHT | 10 |
| FLUSH | 15 |
| FULL HOUSE | 20 |
| FOUR OF A KIND | 25 |
| STRAIGH FLUSH | 40 |
| ROYAL FLUSH | 50 |

In a step S11, if the player's final 5 card poker hand is a winning hand, the player is preferably paid winnings for a winning game outcome. Table 2 illustrates various credit payouts based upon a 1 credit wager. Of course, the amounts of the payouts and the defined winning hands/outcomes may vary. In addition, the player then advances to a third stage or portion of the game. If the player's final 5 card hand was a non-winning (i.e. losing) outcome, then the game preferably terminates with the player losing their wager (but retaining any previously awarded winnings).

If the player advances, then his final 5 card hand is preferably carried over to the next stage of the game. In a step S12, the player is dealt 2 additional cards from the set of cards. These 7 cards form the player's initial 7 card poker hand.

In a step S13, the player selects none, one or more or all of the 7 cards to hold and/or discard. For example, a player may press a hold button of a gaming machine corresponding to each card from the initial 7 card hand which the player wishes to hold or keep.

In a step S14, any cards which are not held are discarded and replacement cards are dealt from the remaining cards in the set of cards for each discarded card. For example, if the player held all 7 cards from the initial hand, no cards would be discarded and replaced. If the player held 4 of the 7 cards from the initial hand, the 3 non-held cards would be discarded and replaced. If the player held no cards from the initial hand, all 7 initial cards would be discarded and replaced. After any cards are discarded and replaced, a final 7 card poker hand is formed.

In a step S15, the player's final 7 card poker hand is evaluated to determine if it is a winning outcome. In a preferred embodiment, various combinations of 7 cards may be formed. One or more, but preferably not all, of those combinations are defined as winning combinations. For example, winning outcomes or combinations may be defined by a pay table such as set forth below.

TABLE 3

| 7 CARD POKER HAND | |
|---|---|
| HAND | PAYOUT |
| TWO THREE OF A KINDS | 1 |
| ONE THREE OF A KIND AND ONE FOUR OF A KIND | 2 |
| STRAIGHT | 10 |
| FLUSH | 15 |
| STRAIGH FLUSH | 40 |
| ROYAL FLUSH | 50 |

In a step S16, if the player's final 7 card poker hand is a winning hand, the player is preferably paid winnings for a winning game outcome. Table 3 illustrates various credit payouts based upon a 1 credit wager. Of course, the amounts of the payouts and the defined winning hands/outcomes may vary.

At a step S17, the game then ends.

One example of a game in accordance with the present invention will now be described with reference to FIGS. 1-9.

Referring to FIG. 1, after a player has placed at least the minimum required wager, the player has been dealt an initial 3 cards poker hand comprising the K♦, A♦ and 8♠.

Figure 2:
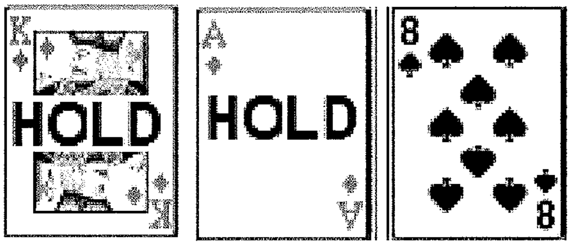

As illustrated in FIG. 2, the player has elected to hold two cards, the K♦ and A♦.

Figure 3:
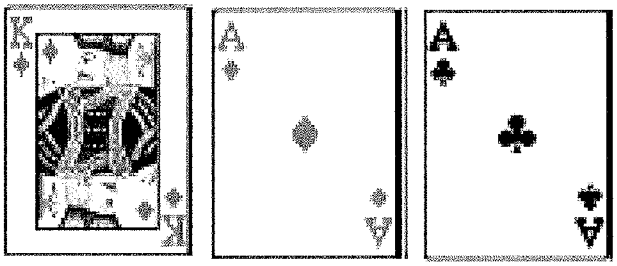

As illustrated in FIG. 3, the remaining card, the 8♠ has been discarded and replaced with the A♣. This final 3 card poker hand is then evaluated. In accordance with the pay table illustrated in Table 1, the Pair of Aces hand comprises a "Pair of Jacks or Better," and thus the final 3 card poker hand is winning and the player is paid a payout.

Figure 4:
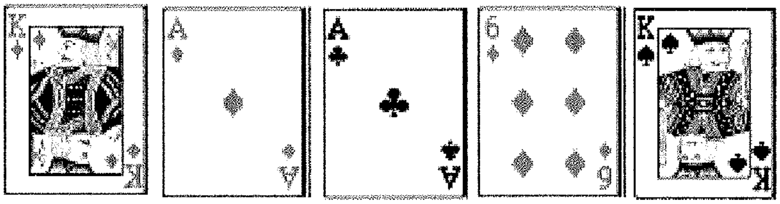

As illustrated in FIG. 4, the player then advances to the next round or stage of the game. As illustrated, the player's final 3 card poker hand comprising the K♦, A♦ and A♣ is augmented with 2 additional cards, the 6♦ and K♠, to form the player's initial 5 card poker hand.

Figure 5:
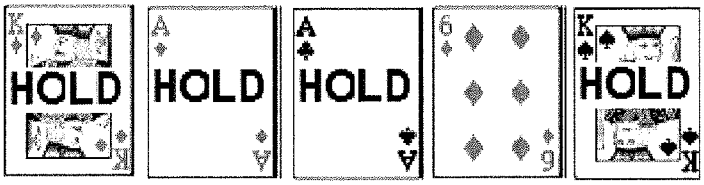

As illustrated in FIG. 5, the player has elected to hold 4 cards from the initial 5 card poker hand, namely the K♦, A♦, A♣ and K♠.

Figure 6:
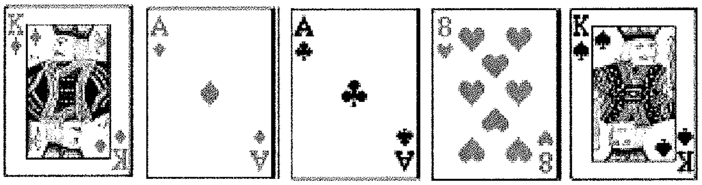

As illustrated in FIG. 6, the remaining card from the initial 5 card poker hand, the 6♦, is discarded. It has been replaced with the 8♥. This final 5 card poker hand is then evaluated. In accordance with the pay table illustrated in Table 2 above, the Pair of Aces and Pair of Kings comprises a "Two Pair" hand, and thus the final 5 card poker hand is winning and the player is paid a payout.

Figure 7:
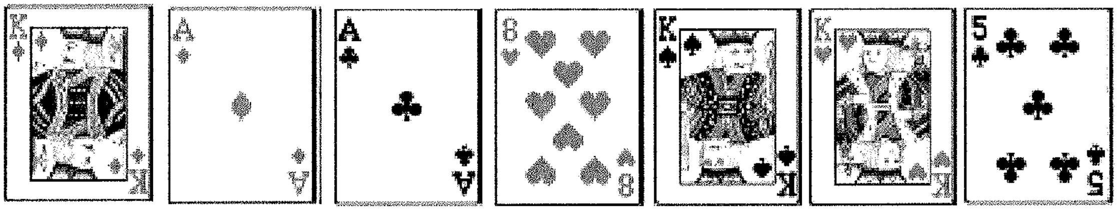

As illustrated in FIG. 7, the player then advances to the next round or state of the game. As illustrated, the player's final 5 card poker hand comprising the K♦, A♦, A♣, 8♥ and K♠ is augmented with 2 additional card, the K♥ and 5♣, to form the player's initial 7 card poker hand.

Figure 8:
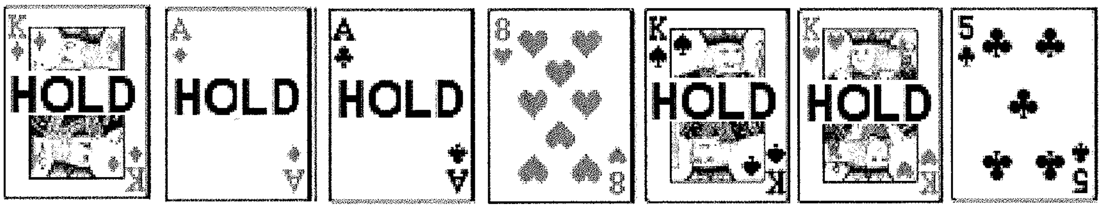

As illustrated in FIG. 8, the player has elected to hold 5 cards from the initial 7 card poker hand, namely the K♦, A♦, A♣, K♠, and the K♥.

Figure 9:
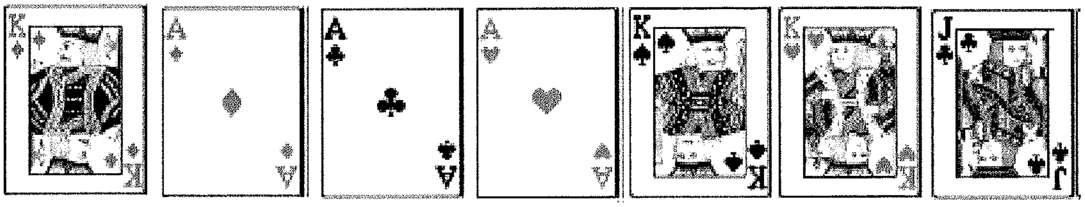

As illustrated in FIG. 9, the remaining 2 cards from the initial 7 card poker hand, the 8♥ and 5♣, have been discarded. Those two cards have been replaced with the A♥ and J♣. This final 7 card poker hand is then evaluated. In accordance with the pay table illustrated in Table 3 above, the Three Aces and Three Kings comprises a "Two Three of a Kind" hand, and thus the final 7 card poker hand is winning and the player is paid a payout.

It will be appreciated that the methods of playing and presenting games of the invention may be implemented in various manners.

In one embodiment, the method of game play may be implemented using physical cards, such as at a gaming table. For example, the game could be played with a deck of fifty-two (52) cards of the four suits (such as ♠ ♣ ♥♦) each having cards with the values 2, 3, 4, 5, 6, 7, 8, 9, 10, Jack (J), Queen (Q), King (K) and Ace (A). Each card might comprise, for example, a media such as paper stock having a front and a back. Preferably, the front bears the card indicia. Preferably, the back is blank or printed with a pattern or the like, thus not providing any indication of the value of the card. Of course, the game might be played with multiple decks or "shoes" of cards. It is possible to play the game with other symbols, whether they are associated with cards or not (for example, the game might be played with dice indicia such as sides of dice having pips and where the player attempts to form combinations of dice).

Figure 10:
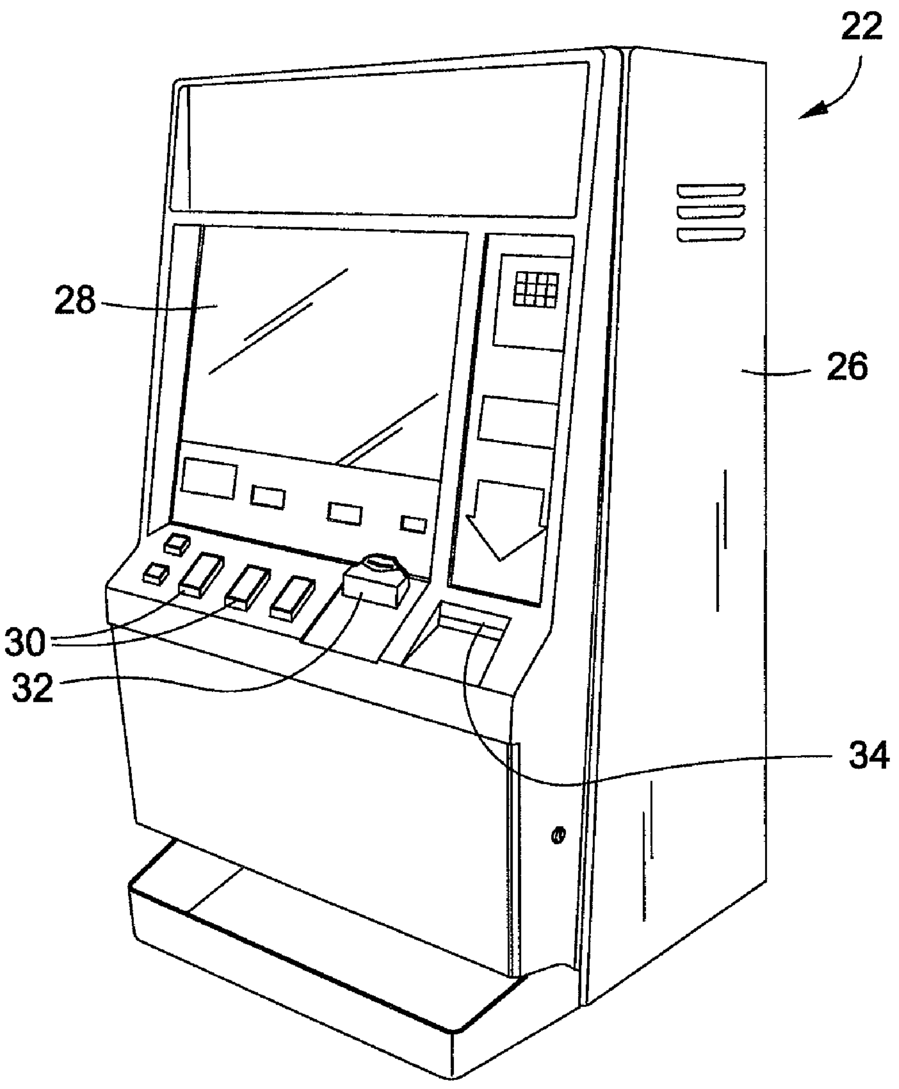
FIG. 10 illustrates a gaming machine configured to present a game in accordance with the present invention.

In a preferred embodiment, however, the method of game play is implemented via a gaming machine or device. Such a gaming machine 22 may have various configurations. One configuration of a gaming machine is illustrated in FIG. 10. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one display device 28 configured to display game information. The display device 28 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touch-screen, a light emitting display (LED) or other suitable displays now known or later developed, in a variety of resolutions, sizes and formats (e.g. 4:3, widescreen or the like). The display 28 may be capable of projecting or displaying a wide variety of information, including images, symbols and other indicia or information associated with game play, game promotion or other events.

As described in more detail below, the gaming machine 22 is preferably configured to present one or more games upon a player making a monetary payment or wager. In this regard, as described in more detail below, the gaming machine 22 includes means for accepting monetary value.

In one embodiment, as detailed above, certain game outcomes may be designated as winning outcomes. Prizes or awards may be provided for winning outcomes, such as monetary payments (or representations thereof, such as prize of credits), or promotional awards as detailed herein. As detailed below, the gaming machine 22 includes means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game, to indicate cards to be held or discarded, to "cash out" of the gaming machine, or to provide various other inputs.

In one preferred embodiment, the gaming machine 22 includes at least one microprocessor or controller for controlling the gaming machine, including receiving player input and sending output signals for controlling the various components of the machine 22 (such as generating game information for display by the display 28). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 28 (such as information representing images of displayed cards), for determining winning or losing game outcomes and for displaying information regarding awards for winning game outcomes, among other things.

The controller may be configured to execute machine readable code or "software" or otherwise process information, such as obtained from a remote server. Software or other instructions may be stored on a memory or data storage device. The memory may also store other information, such as pay table information. The gaming machine 22 may also include one or more random number generators for generating random numbers, such as for use in selecting cards and for presenting the game in a random fashion.

Preferably, the controller is configured to execute machine readable code or instructions which are configured to implement the method of game play of the invention. For example, the controller of the gaming machine 22 may be configured to detect a wager, such as a signal from a player's depressing of the "bet one" button. Upon such an event and/or the player otherwise signaling the gaming machine to present the game, the controller may be configured to cause images of cards comprising the initial 3 cards hand to be displayed on the at least one display 28. The controller may accept input from a player of one or more cards to be held or discarded via the one or more player input devices of the gaming machine 22.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 22 is configured to present one or more wagering games. Thus, the gaming machines 22 is preferably configured to accept value, such as in the form of coins, tokens, paper currency or other elements or devices representing value such as monetary funds. For example, as illustrated in FIG. 10, the gaming machine 22 might include a coin acceptor 32 for accepting coins. Of course, associated coin reading/verifying devices and coin storage devices may be associated with the gaming machine 22 if it is configured to accept coins. Likewise, the gaming machine 22 might include a media reader 34. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 22 dispensing coins to a coin tray. In another embodiment, funds may be issued by dispensing paper currency. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference.

It will be appreciated that the gaming machine illustrated in FIG. 10 is only exemplary of one embodiment of a gaming machine. For example, it is possible to for the gaming machine to have various other configurations, including different shapes and styles and having different components than as just described.

For example, it is possible for the game of the invention to be presented on a computing device, including at a home or office computer. In one embodiment, a player might log in to a casino server and the controller of the casino server may cause game information to be delivered to the player's computer and then be displayed on a display of the player's computer. In this regard, it will be noted that the term "controller" may comprise more than one device. For example, in a server-based environment, a controller at a server may generate game information and transmit that information to a local controller at a gaming machine. The local controller at the gaming machine may then cause game information to be displayed on the display of the gaming machine. The games of the invention could also be presented by or at hand-held devices, such as PDAs, cellular phones, tablet computing devices or the like.

As indicated above, when the game is presented in an electronic environment, the steps of dealing cards may comprise or include the step of displaying card indicia. For example, when played at a gaming machine 22 such as described above, a controller of the gaming machine may be configured to randomly select 3 initial cards from a set of cards and cause images of those three cards to be displayed on the display of the gaming machine.

The player preferably utilizes the one or more gaming machine inputs to interact with the gaming machine, such as to indicate the cards to be held from the initial 3 card hand. The controller preferably receives the one or more inputs and then causes any discarded cards to no longer be displayed and preferably randomly selects a replacement card for each discarded card and causes an image of each replacement card to be displayed, and so on in accordance with the method described above.

As indicated above, the invention may have various embodiments, including various alternate forms of play. In addition, the invention has numerous benefits.

It will be appreciated that the game of the invention may have numerous variations. For example, the game could be played with wild cards, such as wild "2s" or "Jacks" as is known in other poker games.

In one embodiment, the payouts for winning hands may comprise fixed amounts. In other embodiments, the payouts might comprise changing amounts, such as progressive jackpots. For example, a portion of each wager might be allocated to one or more progressive jackpots which are awarded when a player receives a particular winning outcome. In a preferred embodiment, each winning 7 card poker hand has an associated progressive jackpot.

As further described above, a player may be required to place a maximum wager in order to be eligible to win such jackpots. For example, if a player places less than a maximum wager, the player may be paid winnings for a winning 7 card poker hand in accordance with a pay table which defines smaller, fixed payouts (such as illustrated in Table 3 above). On the other hand, if the player places the required maximum wager, the progressive jackpots may be activated and the jackpot amounts may be displayed to the player.

The game in accordance with the present invention has numerous advantages. One advantage of the invention is an exciting poker game which may be played by a single player against a pay table or "the house". In particular, the game can be presented via a casino-style gaming machine or be played online via a single player and does not require multiple players.

Another advantage of the invention is that the game offers a player multiple stages or rounds as part of the same game. In a standard 5 card draw poker game, a player plays a single hand and then the game is completed, whether the game is a winning or losing outcome. In accordance with the invention, the player has the opportunity to play a 3 card poker hand and the potential to play additional 5 and 7 card poker hands as part of the same game.

In a preferred embodiment, the player has the opportunity to play all stages of the game based upon a single wager (if the player wins each successive stage, as indicated above). In other words, the player is preferably not required to place an additional wager after the 3 card portion of the game to advance to the 5 card portion. It is possible, however, to require the player to place an addition wager to progress to each stage or round (such as by requiring the player to place an additional wager if the result of the 3 card game is a winning result and the player wishes to progress to the 5 card round of the game).

In addition, the game offers the player the opportunity for up to three awards or payouts based upon the single wager (assuming the player receives a winning 3, 5, and 7 card hand). In one embodiment, winnings may be paid as each winning hand is achieved (such as after a winning 3 card hand, then after a winning 5 card hand and then after any winning 7 card hand). Alternatively, winnings might be paid in a single lump sum at the end of the game, such as after the player receives a losing 5 card hand (wherein the player is paid winnings for the earlier winning 3 card hand), after the player receives a losing 7 card hand (wherein the player is paid winnings for the earlier winning 3 and 5 card hands), or after the player receives a winning 7 card hand (wherein the player is paid winnings for all three hands at one time).

One exciting feature of the game is that each successive round of the game builds upon the prior round. As indicated above, if the player wins the 3 card portion of the game, the player's final 3 card hand is used in forming the player's initial 5 card hand. This is advantageous because the player's 3 card hand had to be winning in order for the player to advance. Thus, the player has the advantage of starting with 3 "winning" cards in forming the initial 5 card hand. This same principal applies to the transition from the 5 card to the 7 card hand.

In addition, the player is preferably afforded the opportunity to replace/discard none, one or more or all of the cards in each of their initial hands. Thus, the player has the opportunity to strategize upon each initial hand and attempt to better that hand by discarding and replacing cards. This allows the player to remain engaged in each round of play, as the player's input at each round may significantly affect the outcome of that round.

In one embodiment, the discard and replace feature might be implemented in various manners. For example, the set of cards might be displayed face-down in a field and the player might be permitted to discard cards and then pick replacement cards from the field of replacement cards, or be permitted to swap discarded cards with such replacement cards.

It is possible for the game to include additional rounds or other features. For example, it is possible for the game to continue with a 9 card round, an 11 card round or the like.

It is also possible for the game to utilize differing numbers of cards at each stage or round. For example, the game could be played with a 3 card, 4 card and 5 card round or stage (rather than 3, 5 and 7 card stages).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of playing a game at a gaming machine comprising the machine-implemented steps of:

accepting a wager from a player via a wager input device of said gaming machine;

displaying an initial 3 card hand from a set of cards to said player on at least one electronic video display of said gaming machine;

accepting input from said player of none, one or more or all of said 3 cards from said 3 card hand as cards to be replaced via at least one player input device of said gaming machine;

replacing any cards to be replaced with cards remaining in said set of cards to form a final 3 card hand;

if said final 3 card hand is a losing outcome, terminating said game;

if said final 3 card hand is a winning outcome, awarding winnings associated with said winning outcome of said final 3 card hand based upon said wager and displaying an additional 2 cards from cards remaining in said set of cards and combining said additional 2 cards with said final 3 card hand to form an initial 5 card hand;

accepting input from said player of none, one or more of all of said 5 cards from said 5 card hand as cards to be replaced via at least one player input device of said gaming machine;

replacing any cards to be replaced with cards remaining in said set of cards to form a final 5 card hand;

if said final 5 card hand is a losing outcome, terminating said game;

if said final 5 card hand is a winning outcome, awarding winnings associated with said winning outcome of said final 5 card hand based upon said wager and displaying an additional 2 cards from cards remaining in said set of cards and combining said additional 2 cards with said final 5 card hand to form an initial 7 card hand;

accepting input from said player of none, one or more of all of said 7 cards from said 7 card hand as cards to be replaced via at least one player input device of said gaming machine;

replacing any cards to be replaced with cards remaining in said set of cards to form a final 7 card hand; and if said final 7 card hand is a winning outcome, awarding winnings associated with said winning outcome of said final 7 card hand based upon said wager.

2. The method in accordance with claim 1 wherein said initial 3 card hand comprises images of cards displayed face-up on said at least one electronic video display of said gaming machine.

3. The method in accordance with claim 1 wherein said replacing steps comprise displaying replacement cards on said at least one electronic video display of said gaming machine.

4. The method in accordance with claim 1 wherein said at least one wager input device comprises a credit wagering button.

5. The method in accordance with claim 1 wherein said set of cards comprises a single deck of 52 playing cards.

6. A gaming machine comprising:

a controller;

at least one electronic display;

at least one player input device;

at least one wager input device;

machine-readable code executable by said controller to cause said at least one electronic display to display an initial 3 card hand from a set of cards to said player based upon a wager placed by said player via said at least one wager input device;

machine-readable code executable by said controller to cause said controller to accept input from said player via said at least one player input device of none, one or more or all of said 3 cards from said 3 card hand as cards to be replaced;

machine-readable code executable by said controller to cause said controller to replace any cards to be replaced with cards remaining in said set of cards to form a final 3 card hand;

machine-readable code executable by said controller to cause said controller to terminate said game if said final 3 card hand is a losing outcome;

machine-readable code executable by said controller to cause said controller to if said final 3 card hand is a winning outcome, award winnings associated with said winning outcome of said final 3 card hand based upon said wager and display an additional 2 cards from cards remaining in said set of cards and combine said additional 2 cards with said final 3 card hand to form an initial 5 card hand;

machine-readable code executable by said controller to cause said controller to accept input from said player via said at least one player input device of none, one or more of all of said 5 cards from said 5 card hand as cards to be replaced;

machine-readable code executable by said controller to cause said controller to replace any cards to be replaced with cards remaining in said set of cards to form a final 5 card hand;

machine-readable code executable by said controller to cause said controller to terminate said game if said final 5 card hand is a losing outcome;

machine-readable code executable by said controller to, if said final 5 card hand is a winning outcome, award winnings associated with said winning outcome of said final 5 card hand based upon said wager and display an additional 2 cards from cards remaining in said set of cards and combine said additional 2 cards with said final 5 card hand to form an initial 7 card hand;

machine-readable code executable by said controller to cause said controller to accept input from said player via said least one player input device of none, one or more of all of said 7 cards from said 7 card hand as cards to be replaced;

machine-readable code executable by said controller to cause said controller to replace any cards to be replaced with cards remaining in said set of cards to form a final 7 card hand; and machine-readable code executable by said controller to cause said controller to if said final 7 card hand is a winning outcome, award winnings associated with said winning outcome of said final 7 card hand based upon said wager.

7. The method in accordance with claim 6 wherein said set of cards comprises a single deck of 52 playing cards.

* * * * *